United States Patent
Yamazaki

(10) Patent No.: US 12,286,328 B2
(45) Date of Patent: Apr. 29, 2025

(54) OPERATION DISPLAY DEVICE FOR ELEVATOR

(71) Applicant: Mitsubishi Electric Corporation, Tokyo (JP)

(72) Inventor: Yumiko Yamazaki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 819 days.

(21) Appl. No.: 17/434,438

(22) PCT Filed: Mar. 20, 2019

(86) PCT No.: PCT/JP2019/011674
§ 371 (c)(1),
(2) Date: Aug. 27, 2021

(87) PCT Pub. No.: WO2020/188785
PCT Pub. Date: Sep. 24, 2020

(65) Prior Publication Data
US 2022/0144586 A1    May 12, 2022

(51) Int. Cl.
*B66B 5/00* (2006.01)
*B66B 3/00* (2006.01)
(Continued)

(52) U.S. Cl.
CPC ............ *B66B 5/0087* (2013.01); *B66B 3/002* (2013.01); *G08C 23/04* (2013.01); *G02F 1/133308* (2013.01)

(58) Field of Classification Search
CPC ..... B66B 5/0087; B66B 3/002; B66B 1/3407; B66B 1/46; B66B 1/468; G08C 23/04; G02F 1/133308
See application file for complete search history.

(56) References Cited

U.S. PATENT DOCUMENTS

| | | | |
|---|---|---|---|
| 2012/0305342 A1* | 12/2012 | Yuasa | B66B 3/02 187/397 |
| 2015/0185791 A1* | 7/2015 | Hall | G09F 13/22 |
| 2018/0074635 A1* | 3/2018 | Witczak | H01H 13/70 |

FOREIGN PATENT DOCUMENTS

| | | | |
|---|---|---|---|
| JP | 5-330748 A | | 12/1993 |
| JP | H09-315711 A | | 12/1997 |
| JP | 2013189287 A | * | 9/2013 |

OTHER PUBLICATIONS

Chinese Office Action issued Oct. 14, 2022 in corresponding Chinese Patent Application No. 201980093952.3 (with machine-generated English translation), 13 pages.
(Continued)

*Primary Examiner* — Paisley L Wilson
*Assistant Examiner* — Agnes Dobrowolski
(74) *Attorney, Agent, or Firm* — XSENSUS LLP

(57) ABSTRACT

In order to make an operation display device that performs floor setting or maintenance work remotely with a remote controller smaller and better in design, it is equipped with: a faceplate 6 having a display opening 6a; a transmissive plate 7 closing the display opening 6a; an internal sheet metal 9 having a wiring opening 9a and disposed on the back side of the faceplate 6; a liquid crystal display 8 fixed to the front face of the internal sheet metal 9 so as to face the display opening 6a and having a cable 10 passed through the wiring opening 9a to the back side of the internal sheet metal 9; and an infrared receiving device 12 provided on the back side of the internal sheet metal 9 to receive infrared rays 5a from the remote controller 5.

4 Claims, 3 Drawing Sheets

(51) Int. Cl.
*G08C 23/04* (2006.01)
*G02F 1/1333* (2006.01)

(56) References Cited

OTHER PUBLICATIONS

International Search Report and Written Opinion mailed on May 7, 2019, received for PCT Application PCT/JP2019/011674, Filed on Mar. 20, 2019, 8 pages including English Translation.

* cited by examiner

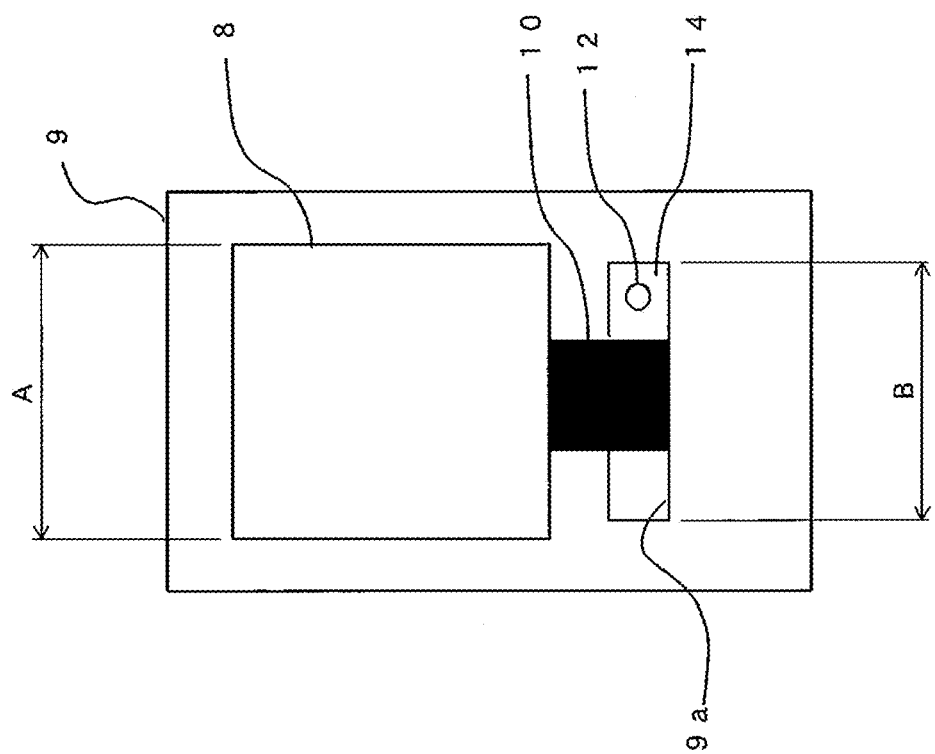

OPERATION DISPLAY DEVICE FOR ELEVATOR

CROSS-REFERENCE TO RELATED APPLICATION

The present application is based on PCT filing PCT/JP2019/011674, filed Mar. 20, 2019, the entire contents of which are incorporated herein by reference.

TECHNICAL FIELD

This invention relates to an operation display device to be installed and operated in an elevator hall.

BACKGROUND ART

An operation display device to perform floor setting or maintenance work remotely with a remote controller has an infrared receiving unit on its surface (e.g., Patent documents 1 and 2). In Patent Document 1, an infrared receiving unit is provided on one of the plural segmented surfaces. In Patent Document 2, an infrared receiving device is placed behind a transmissive plate. In addition, a groove with an inverted U-shaped cross section is formed at the bottom of the transmissive plate to shield the light, and the front of the infrared receiving device is open. Further, an indicator including a display unit and the infrared receiving device is placed on the surface of the car operation panel.

PRIOR ART DOCUMENT

Patent Document

Patent Document 1: Japanese Unexamined Patent Application Publication No. H5-330748 (FIGS. 2 and 3)
Patent Document 2: Japanese Unexamined Patent Application Publication No. 2013-189287 (FIGS. 1 and 2)

SUMMARY OF INVENTION

Technical Problem

In the prior art document 1, because the infrared receiving unit is separated from components including the direction display unit that indicates the ascending and descending of the car, the operation display device itself is large and its design is not good. The prior art document 2 does not describe the case where the display unit is integrated with the surface of the operation display device. In order to integrate the display unit and the infrared receiving unit on the surface, parts for fixing the respective units are required.

The purpose of this invention is to solve the above problems and to provide a compact and well-designed infrared-receiving-unit-equipped operation display device.

Solution to Problem

An operation display device for an elevator according to the invention includes: a faceplate having a display opening; a transmissive plate closing the display opening; an internal sheet metal having a wiring opening and disposed on a back side of the faceplate; a liquid crystal display fixed to a front face of the internal sheet metal so as to face the display opening and having a cable passed through the wiring opening to a back side of the internal sheet metal; and an infrared receiving unit provided on the back side of the internal sheet metal and arranged at a position avoiding the cable, to receive infrared rays from a remote controller via the transmissive plate, the display opening, and the wiring opening.

Advantageous Effects of Invention

According to the present invention, it is possible to provide a compact and well-designed operation display device with an infrared receiving unit.

BRIEF DESCRIPTION OF DRAWINGS

FIG. 3 is a diagram showing an infrared receiving unit of the operation display device.

DESCRIPTION OF EMBODIMENTS

Hereinafter, the present invention will be described in detail with reference to the drawings.

Embodiment 1

Figure 1:
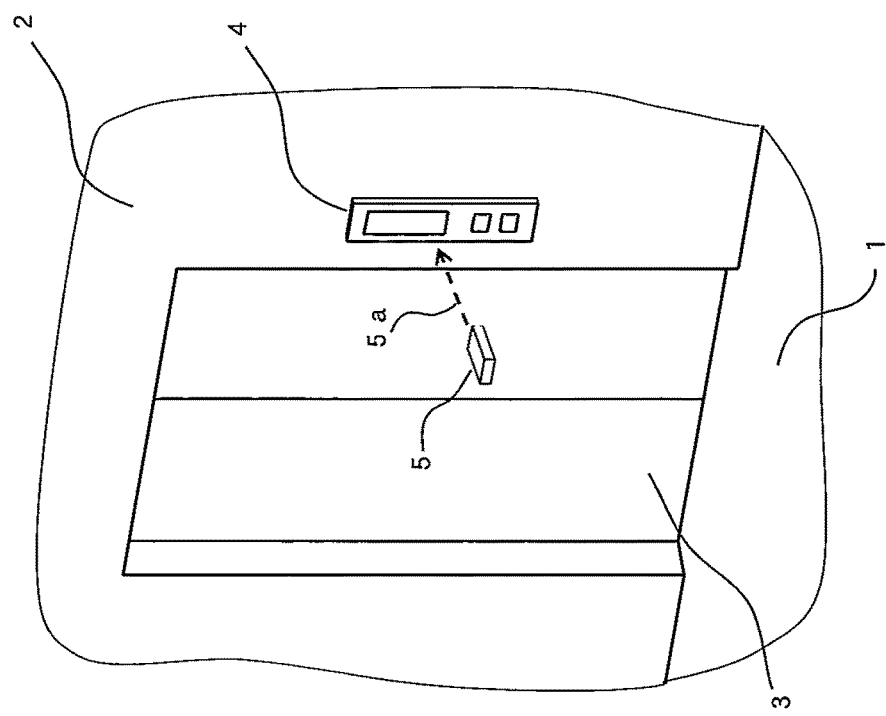
FIG. 1 is a diagram showing an operation display device according to Embodiment 1 of the present invention installed in a hall.
Figure 2:
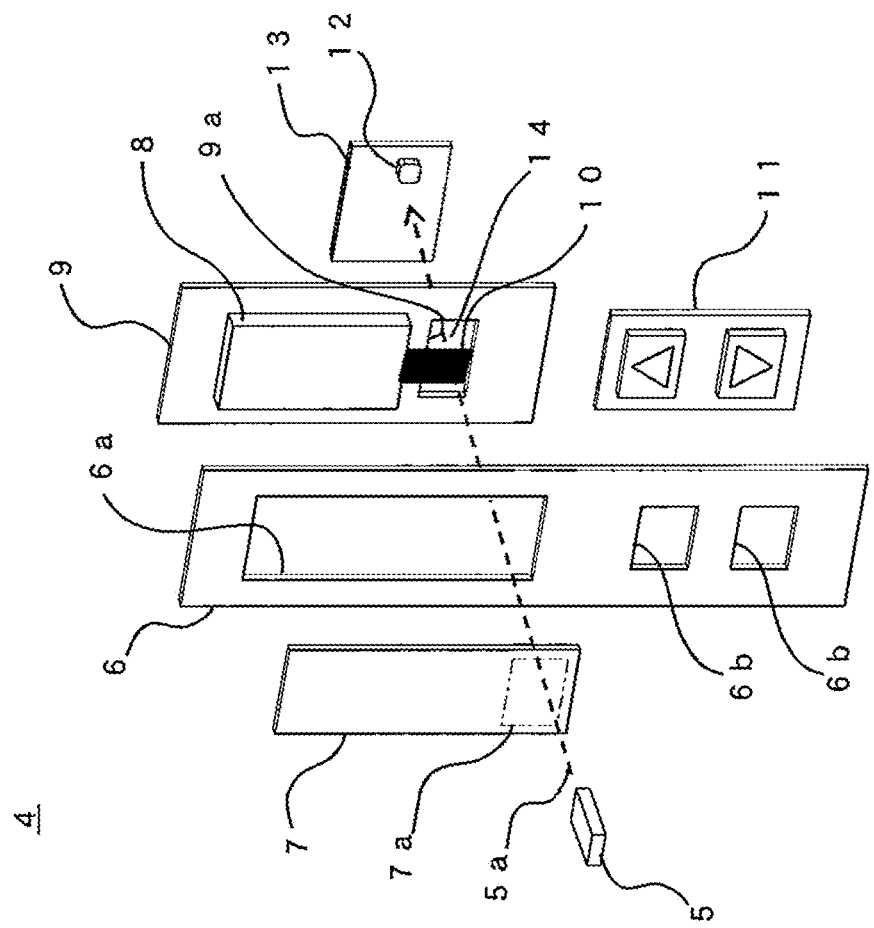
FIG. 2 shows details of the operation display device.

FIGS. 1 to 3 explain Embodiment 1 of the disclosure. The same reference numerals denote the same components, and descriptions thereof will be omitted. FIG. 1 shows an operation display device 4 installed in a hall 1. A building wall 2 of the hall 1 is provided with a doorway 3 of an elevator. The operation display device 4 is provided on the building wall 2 next to the doorway 3. FIG. 1 shows a remote controller 5 emitting infrared rays 5a to operate the operation display device 4.

FIG. 2 shows a configuration of devices disposed on a face plate 6 that is provided on the surface of the operation display device 4. The faceplate 6 has a display opening 6a. The display opening 6a is closed by a transmissive plate 7. The faceplate 6 also has switch openings 6b. Up and down buttons 11 are disposed in the switch openings 6b from the back side of the faceplate 6. An internal sheet metal 9 provided with a liquid crystal display 8 is fixed to the back side of the faceplate 6. The liquid crystal display 8 is fixed to the internal sheet metal 9 so as to face the display opening 6a. Then, a substrate 13 with an infrared receiving device 12, which is an infrared receiving unit, is fixed to the back side of the internal sheet metal 9. The infrared rays 5a emitted from the remote controller 5 pass through the transmissive plate 7, the display opening 6a, and the internal sheet metal 9, and are received by the infrared receiving device 12.

The up and down buttons 11 disposed in the switch openings 6b are buttons for calling an elevator car to go up or down.

The transmissive plate 7, which is a transparent or translucent plate component, shows elevator information displayed on the liquid crystal display 8. The elevator information includes ascending and descending of the car and the car position (floor). An area 7a of the transmissive plate 7 that faces a wiring opening 9a and a cable 10 of the internal sheet metal 9 is translucent.

The liquid crystal display 8 is disposed on the internal sheet metal 9. The internal sheet metal 9 has the wiring opening 9a for passing the cable 10 of the liquid crystal display 8 to the back side. The cable 10 is for supplying power to and communicating with the liquid crystal display 8. Here, even after the cable 10 is passed through the wiring opening 9a, a gap 14 remains in the wiring opening 9a. The infrared rays 5a emitted from the remote controller 5 pass through the gap 14.

FIG. 3 shows a disposition of the infrared receiving device 12. FIG. 3 is a drawing viewed from the display opening 6a toward the internal sheet metal 9. The infrared receiving element 12 can be seen in the gap 14 that remains in the wiring opening 9a through which the cable 10 is passed. The width B of the wiring opening 9a is narrower than the width A of the liquid crystal display 8.

FIG. 2 shows the devices to be attached to the faceplate 6, but when the operation display device 4 is fixed to the building wall 2, a case may be provided to cover the devices attached to the faceplate 6. The operation display device 4 may be installed not only in the hall but also in the car.

According to Embodiment 1, the following effects can be obtained. Because the faceplate 6 having a display opening 6a, the transmissive plate 7 closing the display opening 6a, an internal sheet metal 9 having a wiring opening 9a and disposed on the back side of the faceplate 6, the liquid crystal display 8 fixed to the front face of the internal sheet metal 9 so as to face the display opening 6a and having the cable 10 passed through the wiring opening 9a toward the back side of the internal sheet metal 9, and the infrared receiving device 12 provided on the back side of the internal sheet metal 9 and arranged at a position avoiding the cable 10 to receive infrared rays 5a from the remote controller 5 via the transmissive plate 7, the display opening 6a, and the wiring opening 9a are included, the infrared receiving unit can be provided in the operation display device 4 in a compact manner with good design.

Also, because the width of the opening for wiring 9a is narrower than the width of the liquid crystal display 8, and the infrared receiving device 12 is located within the range of the width of the wiring opening 9a, the minimum width of the faceplate 6 is not restricted by the width of the wiring 9a and the location of the infrared receiving element 12. This improves the flexibility of the design of the operation display device 4.

Also, a portion of the transmissive plate 7 that faces the wiring opening 9a and the cable 10 is translucent to allow the infrared rays 5a from the remote controller 5 to pass therethrough. This makes the wiring opening 9a and the cable 10 invisible from the outside, improving the design.

REFERENCE SIGNS 4 operation display device, 5 remote controller, 5a infrared rays, 6 faceplate, 6a display opening, 6b switch opening, 7 transmissive plate, 8 liquid crystal display, 9 internal sheet metal, 9a wiring opening, 10 cable, 11 up and down buttons, 12 infrared receiving device, 13 substrate, 14 gap.

The invention claimed is:

1. An operation display device for an elevator comprising:
   a faceplate having a display opening which is an aperture through the faceplate;
   a transmissive plate closing the display opening;
   an internal sheet metal having a wiring opening and disposed on a back side of the faceplate;
   a liquid crystal display fixed to a front face of the internal sheet metal so as to face the display opening and having a cable passed through the wiring opening to a back side of the internal sheet metal; and
   an infrared receiving unit provided on the back side of the internal sheet metal and arranged at a position avoiding the cable, to receive infrared rays from a remote controller via the transmissive plate, the display opening, and the wiring opening.

2. The operation display device for an elevator according to claim 1, wherein:
   a width of the wiring opening is narrower than a width of the liquid crystal display, and
   the infrared receiving unit is located within a range of the width of the wiring opening.

3. The operation display device for an elevator according to claim 1, wherein a portion of the transmissive plate that faces the wiring opening and the cable is translucent so as to allow the infrared rays from the remote controller to pass therethrough.

4. The operation display device for an elevator according to claim 1, wherein:
   the cable is for supplying power to and communicating with the liquid crystal display.

* * * * *